(12) United States Patent
Li et al.

(10) Patent No.: US 8,951,011 B2
(45) Date of Patent: Feb. 10, 2015

(54) WIND TURBINE AND A METHOD FOR MONITORING A WIND TURBINE

(75) Inventors: Xiao Qian Li, Singapore (SG); Ingemann Hvas Sandvad, Singapore (SG); Srikanth Narasimalu, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 961 days.

(21) Appl. No.: 13/125,488

(22) PCT Filed: Oct. 21, 2009

(86) PCT No.: PCT/EP2009/063820

§ 371 (c)(1),
(2), (4) Date: Aug. 16, 2011

(87) PCT Pub. No.: WO2010/046403

PCT Pub. Date: Apr. 29, 2010

(65) Prior Publication Data

US 2011/0285129 A1 Nov. 24, 2011

Related U.S. Application Data

(60) Provisional application No. 61/107,819, filed on Oct. 23, 2008.

(30) Foreign Application Priority Data

Oct. 23, 2008 (DK) .................................. 2008 01469

(51) Int. Cl.
*F03D 7/02* (2006.01)
*F03D 1/06* (2006.01)
*F03D 7/04* (2006.01)

(52) U.S. Cl.
CPC ................ *F03D 1/06* (2013.01); *F03D 7/0224* (2013.01); *F03D 7/024* (2013.01); *F03D 7/042* (2013.01);
(Continued)

(58) Field of Classification Search
CPC ............ F03D 7/00; F03D 7/02; F03D 7/022; F03D 7/0224; F03D 7/0244; F03D 11/00; F03D 11/0091; G01M 5/00; G01M 9/00; F05B 2260/80; F05B 2260/821; F05B 2270/807; Y02E 10/721; Y02E 10/723
USPC ............ 416/1, 31, 35–37, 46, 153; 415/1, 17, 415/26, 908
See application file for complete search history.

(56) References Cited

U.S. PATENT DOCUMENTS 6,940,186 B2 * 9/2005 Weitkamp ........................ 290/44
7,246,991 B2 7/2007 Bosche
(Continued)

FOREIGN PATENT DOCUMENTS

EP 1 674 724 6/2006
EP 1 988 284 11/2008
(Continued)

OTHER PUBLICATIONS

Steffen Hostrup Larsen; Search Report issued in priority Denmark Application No. PA 2008 01469; Mar. 27, 2009; 1 page; Denmark Patent and Trademark Office.
(Continued)

*Primary Examiner* — Edward Look
*Assistant Examiner* — Jesse Prager
(74) *Attorney, Agent, or Firm* — Wood, Herron & Evans, LLP

(57) ABSTRACT

According to the inventive concept, there is provided a wind turbine with at least one blade. The wind turbine comprises a first accelerometer mounted at a first radial position of the blade and being adapted to determine a first acceleration value, and a second accelerometer mounted at a second radial position of the blade different from the first radial position, and the accelerometer being adapted to determine a second acceleration value. The wind turbine further comprises a controller adapted to generate a signal based on said first and second acceleration values. There is also provided a method for monitoring a blade of a wind turbine.

18 Claims, 5 Drawing Sheets

(52) U.S. Cl.
CPC ....... *F05B 2260/80* (2013.01); *F05B 2260/821* (2013.01); *F05B 2270/807* (2013.01); *Y02E 10/721* (2013.01); *Y02E 10/723* (2013.01)
USPC .................................. 416/1; 416/31; 416/46

(56) References Cited

U.S. PATENT DOCUMENTS

| | | | |
|---|---|---|---|
| 2004/0057828 A1 | 3/2004 | Bosche | |
| 2006/0033338 A1 | 2/2006 | Wilson | |
| 2009/0277266 A1* | 11/2009 | Wang et al. | 73/514.01 |
| 2010/0074749 A1* | 3/2010 | Garrido et al. | 416/31 |

FOREIGN PATENT DOCUMENTS

| | | |
|---|---|---|
| WO | 99/57435 | 11/1999 |
| WO | 2008/040347 | 4/2008 |
| WO | 2008/081232 | 7/2008 |

OTHER PUBLICATIONS

Steffen Hostrup Larsen; 1st Technical Examination Report issued in priority Denmark Application No. PA 2008 01469; Apr. 23, 2009; 4 pages; Denmark Patent and Trademark Office.

David Biloen; International Search Report issued in priority International Application No. PCT/EP2009/063820; Jan. 27, 2011; 4 pages; European Patent Office.

Gunner C. Larsen et al.; Document entitled "Identification of Damage to Wind Turbine Blades by Modal Parameter Estimation"; Apr. 2002; 30 pages; Riso National Laboratory, Roskilde, Denmark.

Chia Chen Ciang et al.; Document entitled "Structural health monitoring for a wind turbine system: a review of damage detection methods"; 2008; 20 pages; Measurement Science and Technology.

* cited by examiner

WIND TURBINE AND A METHOD FOR MONITORING A WIND TURBINE

TECHNICAL FIELD

The present invention generally relates to wind turbine technology. More specifically, the present invention relates to a wind turbine and a method for monitoring a blade of a wind turbine.

BACKGROUND OF THE INVENTION

In the prior art, wind turbine blades have been monitored using various sensors and technologies. For example strain gages have been embedded in the blade structure and used to estimate a local strain of the blade. However, strain gages suffer from limited stress cycles and since they need to be embedded in the blade structure replacement is cumbersome and time consuming.

Furthermore, optical fibres have been embedded in the blade structure for estimating blade deformation from a change in transmission properties of the fibers as they are stretched during blade deformation. However, optical fibers are prone to breakage and embedding fibers in the blade structure adds to the complexity and cost of blade manufacturing.

In the prior art, blades have also been provided with accelerometers. U.S. Pat. No. 7,246,991 discloses a wind turbine with a sensor that measures the out-of-plane deflection of the blades in order to determine the risk of a tower strike. The sensor arrangement may be in the form of accelerometers mounted on the blades. The accelerometer signals are integrated twice over time to determine the blade deflection. The accelerometer is combined with a stationary sensor on the tower that measures deflection and "zeroes" the accelerometer output once per blade revolution to remove static errors in the signal. Still, the accelerometer requires careful calibration in order to enable reliable measurements of blade deflection.

SUMMARY OF THE INVENTION

In view of the above, an objective of the present invention is to provide a method for improved monitoring of wind turbine blades, wherein the method removes or at least decreases the problems present in the prior art.

According to a first aspect, there is provided a wind turbine with at least one blade. The wind turbine comprises a first accelerometer mounted at a first radial position of the blade and being adapted to determine a first acceleration value, a second accelerometer mounted at a second radial position of the blade different from the first radial position, and the accelerometer being adapted to determine a second acceleration value. The wind turbine further comprises a controller adapted to generate a signal based on the first and second acceleration values.

The first and second radial positions are measured from the center of the rotor. By providing two accelerometers at different radial positions, a reliable and tolerant blade monitoring may be obtained. By using more than one accelerometer and providing them at different positions the blade monitoring may be continued even in case one accelerometer is damaged.

The blade monitoring may relate to the monitoring of a blade condition. Condition is intended to be interpreted in a broad sense, i.e. it may relate to a physical property of the blade such as weight, elasticity, the acceleration of a (part of) the blade, the bending or vibration of the blade. It may also relate to if the blade is in a good condition or if the blade is damaged and presents fractures or cracks.

By determining acceleration at two different radial positions the blade acceleration at different positions along the length of the blade may be estimated.

By generating the signal based on both the first and second acceleration values it becomes possible to use the first accelerometer as a reference for the second accelerometer. The first acceleration value may thus be used to zero or calibrate the second accelerometer value.

By generating the signal based on both the first and second acceleration values it further becomes possible to compensate for effects common to both acceleration values. For instance common mode errors, movement of the entire blade e.g. due to oscillations of the tower, pitching of the blade etc.

According to one embodiment, the controller may be adapted to compare the first and second acceleration values and generate the signal based on a difference between the first and second acceleration values. An increased difference between the first and second acceleration values indicates an increased acceleration of the blade at the second (or first) radial position in relation to the first (or second) radial position.

Since common mode errors and interference will alter the first and second acceleration value in substantially the same amounts, the differential acceleration will not be altered. Thus, by monitoring the blade based on both acceleration values, i.e. monitoring the blade based on the differential acceleration of the blade, these sources of errors are eliminated or at least reduced.

A further advantage relates to the varying pitch angle a blade may assume. A changed pitch angle of a blade reorients the accelerometers. Consequently the determined acceleration values will change. If blade monitoring is based on only a single accelerometer value or two acceleration values used in isolation of each other, the current pitch angle needs to be monitored and taken into account when processing the acceleration values. This adds to the complexity of the blade monitoring. However, since a change of pitch angle reorients the sensitive axes of both accelerometers equally the difference between the first and second acceleration values will not change and the blade monitoring is advantageously simplified.

Furthermore, the controller may be adapted to weight at least one of the first and second acceleration values prior to the comparison. By weighting the acceleration values it is possible to compensate for inherent differences in the measurement conditions between the first and second radial positions for example due to differences in blade and material properties at the two radial positions etc.

Especially, one may compensate for the effects the difference in radial position have on the determined acceleration values. For example, if acceleration values in a tangential direction of a blade are determined one may remove the acceleration contributions induced by a varying rotational speed of the rotor of the wind turbine by appropriate weighting. The accuracy of the blade acceleration values may thus be increased. As a specific example, the weight may be a ratio of the first radial position and the second radial position. The weight may be applied to the second acceleration value.

The controller may be adapted to generate the signal if the difference exceeds a threshold. Everything falling below the threshold will be treated as noise and no signal will be generated. The threshold may be chosen for reducing the influence of interference, small vibrations of the blade and noise on the relevant acceleration values.

According to one embodiment, the controller may be adapted to determine an estimate of the second acceleration value based on the first acceleration value and generate the signal if a difference between the second acceleration value and the estimate of the second acceleration value exceeds a threshold. From testing or a theoretical model the response of a blade under different loads may be established. By knowing the response of the blade, it is hence possible to form an estimate of the second acceleration value based on the first acceleration value.

As a specific illustrative example, during test or simulation the accelerations of the blade at a first and second radial position may be estimated for an expected range of wind loads. If, in operation, an estimated acceleration value differs from a determined acceleration value this may indicate that the wind loads deviate from the normal range. I.e. the estimate represents an expected second acceleration value, based on the first acceleration value. The deviation between the estimated acceleration value and the determined acceleration value may also be due to changes of the blade condition. For example, fractures in the blade or icing on the blade may change the response of the blade. It could also be an indication of an error in one of the accelerometers.

The comparison of the first and second acceleration values may advantageously be combined with the forming of the estimate. That is, the controller may be adapted to form an estimate of the second acceleration value based on the first acceleration value. If the difference between the determined acceleration value and the estimate falls below a threshold, the first and second acceleration values may be compared and the signal may be generated based on a difference between the first and second acceleration values. However, if the difference between the determined acceleration value and the estimate exceeds a threshold this may be an indication of e.g. faulty accelerometers, blade overloading, large blade bending, fractures in the blade, interference in the first and second acceleration values, quick transient blade vibrations, twisting of the blade etc. The comparison of the first and second acceleration values may then be skipped since the result of the comparison may be unreliable i.e. the value of the differential acceleration may be unreliable or inaccurate. Such conditions may thus be detected prior to performing the comparison and an unnecessary comparison and associated signal generation may thereby be avoided.

With the above-described combination of estimate and comparison of determined acceleration values, the reliability and/or efficiency of the blade monitoring is advantageously increased.

The controller may be adapted to determine the acceleration estimate based on the first acceleration value, the first radial position and the second radial position. Especially, the controller may be adapted to determine the acceleration estimate based on a linear prediction of the second acceleration value. As a first order approximation, the blade will bend linearly under the influence of a wind load. Consequently, the acceleration values will vary linearly as function of the radial distance from the hub. The linear approximation is advantageous since it is easy to implement, requires little or no blade testing during manufacture and is computationally efficient. An additional advantage is that it is a fairly accurate model at least for moderate wind loads. For increasing wind loads, the non-linear blade bending will increase and the accuracy of the estimate will hence decrease. A decreasing accuracy results in an increasing difference between the estimate and the determined acceleration values. Consequently, the difference may be used as an estimate of the blade load or bending.

The controller may be adapted to generate the signal based on acceleration values determined for a common direction. Advantageously, the common direction is at least one of the tangential direction of the blade or the orthogonal direction to the rotational plane of the blade. The acceleration values may also be determined for the centrifugal or radial direction of the blade. This may be used to monitor the centrifugal acceleration of the blade, the blade tip speed and the rotational stability of the blade.

The signal generated by the controller may be a control signal and the controller may be adapted to control the operation of the wind turbine in accordance with the control signal. The controlling may comprise pitching the blade. The controlling may also comprise braking of the wind turbine or yawing the wind turbine. As an illustrative example, if the bending of the blade increases (increased difference between the determined first and second acceleration values, or between an acceleration estimate and a determined acceleration value) this may be countered by controlling the wind turbine accordingly. This may prevent large blade bending and overloading of the blade and wind turbine. The signal generated by the controller may also be used for monitoring purposes, wherein the signal may be provided to a control station and presented as e.g. a graph on a display. An operator at the control station may then track the behaviour of the blade and react to any anomalies in the operation of the blade.

The blade may comprise further accelerometers. E.g. if three accelerometers are used, a signal may be generated based on the accelerometer values of the three accelerometers. All pairs of accelerometer values may be compared and the signal may be generated if one or all of the differences exceed a threshold. Furthermore, the acceleration of the blade at a third point may be estimated from the acceleration of the blade at the first point and/or the second point. The estimated response may then be compared to the actual measured response at the third point.

Furthermore, the estimate may be formed using more than one measured acceleration. E.g. the blade acceleration at a third point may be estimated from the acceleration of the blade at both a first and a second point.

According to a second aspect, the present invention is realized by a method for monitoring a blade of a wind turbine. The method comprises determining a first acceleration value at a first radial position of the blade, determining a second acceleration value at a second radial position of the blade, the second position being different from the first position, and generating a signal based on the first and second acceleration values.

The specifics and advantages discussed in relation to the inventive wind turbine applies correspondingly to the inventive control method.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
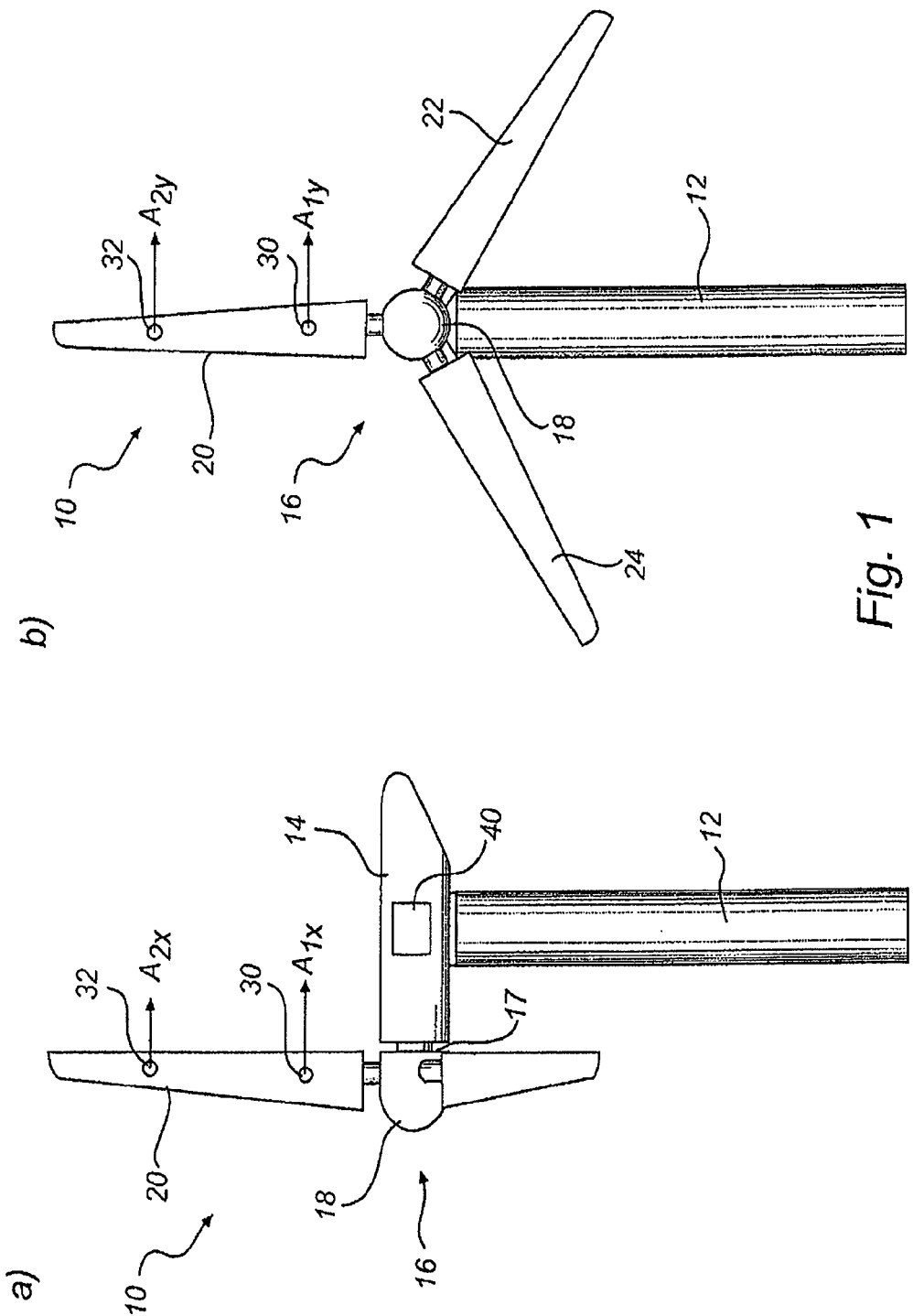
FIGS. 1a and b is a side-view and front view, respectively, of a wind turbine according to a first embodiment in accordance with the inventive concept.

FIG. 1 illustrates a wind turbine 10 according to a first embodiment of the present invention. The wind turbine 10 comprises a tower 12 and a nacelle 14 mounted on top of the tower 12. A rotor 16 comprising hub 18 and blades 20, 22, 24 are connected to a main shaft 17 of the nacelle 14. The blades 20, 22, 24 are connected to the hub 18 and are individually pitchable by a pitch mechanism (not shown) in the hub 18.

In operation the blades 20, 22, 24 of wind turbine 10 are subjected to various loads such as wind loads and loads resulting from the rotation of the blades 20, 22, 24. The loads acting on the blades 20, 22, 24 will deform and bend the blades 20, 22, 24. A blade 20, 22, 24 will bend essentially in two directions, orthogonal to a rotational plane of the blade (x-direction) and parallel to the tangential direction of the rotation of the blade (y-direction).

Figure 2:
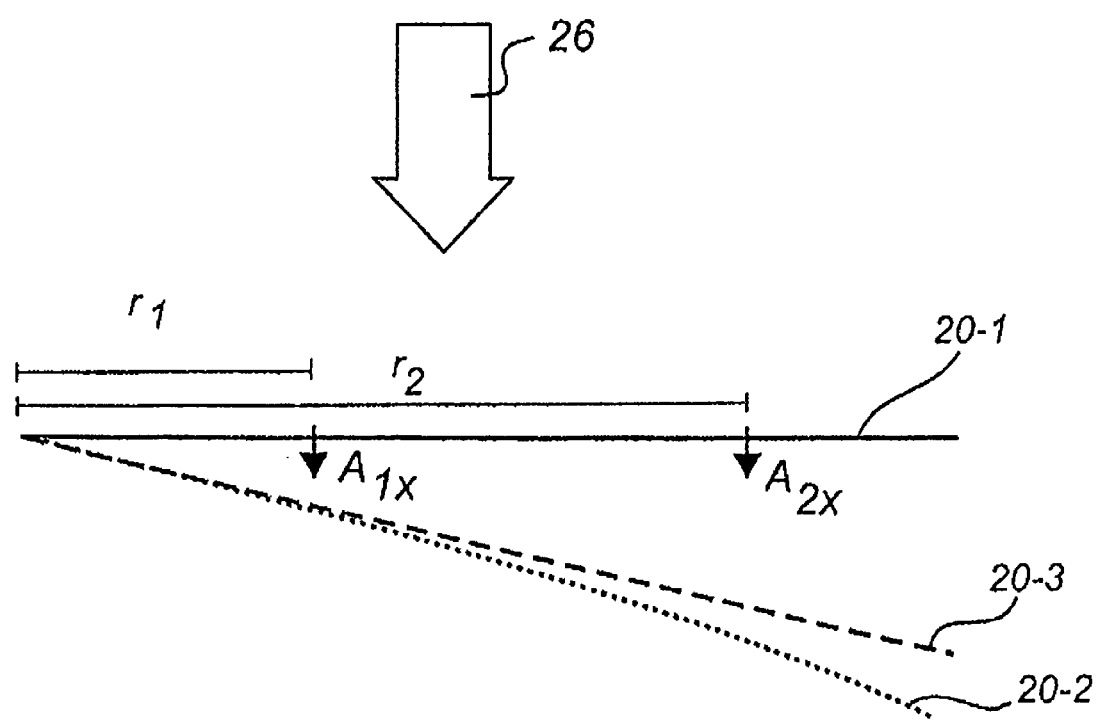
FIG. 2 diagrammatically illustrates un-deformed and deformed blades.

With reference to FIG. 2, a blade 20 is subjected to a load 26 due to wind, gravity or rotation etc. For clarity, the blade is only schematically illustrated. The line 20-1 schematically illustrates the blade 20 in an unbent state. In FIG. 2, the load is acting in the x-direction. Under the influence of the load 26 the blade 20 assumes a bended state 20-2. An increased bending of the blade 20 gradually increases the blade resilience. The blade resilience acts as a force oppositely directed to the direction of the load 26. Eventually, this blade force will balance the load 26 and the blade bending will stop. The blade 20 will stay in the bent state until either the load 26 increases, decreases or changes direction. Consequently, the load 26 will accelerate the blade 20 and this acceleration may be determined using accelerometers.

A first acceleration value $A_{1x}$ of the blade 20 at a first radial position $r_1$ may be determined using a first accelerometer 30. A second acceleration value $A_{2x}$ of the blade at a second radial position $r_2$ may be determined using a second accelerometer 32. $A_{1x}$ and $A_{2x}$ thus gives information regarding the acceleration of the blade 20 at $r_1$ and $r_2$. The acceleration values may be used to estimate the loads acting on the blade 20 and/or the blade bending. By comparing $A_{1x}$ to $A_{2x}$ the acceleration of the blade 20 at $r_2$ may be determined in relation to the acceleration at $r_1$. In other words, the differential acceleration of the blade 20 between $r_1$ and $r_2$ may be monitored. Of course, the sign of the differential acceleration will depend on which direction the blade 20 is being accelerated in. Optionally, one may measure the acceleration of the blade 20 at further points, e.g. three or four etc.

The differential acceleration may be monitored separately or in combination with monitoring of the individual acceleration values $A_{1x}$ and $A_{2x}$.

The comparison of acceleration values may be correspondingly carried out for the y-direction and corresponding acceleration values $A_{1y}$ and $A_{2y}$. Optionally, additional considerations can be made for the tangential direction. If the angular speed of the rotor 16 varies, the measured values $A_{1y}$ and $A_{2y}$ will also vary. If the first accelerometer 30 and the second accelerometer 32 are provided at different radial positions, an angular acceleration will affect $A_{1y}$ and $A_{2y}$ differently and thus change the difference between $A_{1y}$ and $A_{2y}$. The monitored differential acceleration will thus change. This could erroneously indicate blade bending even if the blade 20 is un-deformed. The total measured accelerations $A_{1y}$ and $A_{2y}$ will be:

$$\begin{cases} A_{1y} = A_{1y,bending} + A_{1y,acceleration} = A_{1y,bending} + \dot{\omega} r_1 \\ A_{2y} = A_{2y,bending} + A_{2y,acceleration} = A_{2y,bending} + \dot{\omega} r_2 \end{cases} \quad \text{(Eq. 1)}$$

where $\dot{\omega}$ is the angular acceleration of the blade, i.e. the time rate of change of the angular speed of the rotor. Normally, the angular acceleration will be very small and may therefore be ignored. However if an increased accuracy is needed the component introduced from the angular acceleration may be removed by appropriate weighting of either $A_{1y}$ or $A_{2y}$ prior to performing the comparison. This is illustrated in Eq. 2:

$$A_{1y} - \frac{r_1}{r_2} A_{2y} = (A_{1y,bending} + \dot{\omega} r_1) - \frac{r_1}{r_2}(A_{2y,bending} + \dot{\omega} r_2) = \quad \text{(Eq. 2)}$$
$$= A_{1y,bending} - \frac{r_1}{r_2} A_{2y,bending}$$

where the rightmost expression is independent of the angular acceleration. It should be noted that the weight used in Eq. 2 only is meant as an illustrative non-limiting example. Further non-limiting examples of weights are $$\frac{r_2}{r_1} A_{1y} - A_{2y} = \frac{r_2}{r_1} A_{1y,bending} - A_{2y,bending} \quad \text{(Eq. 3)}$$

or $$\frac{1}{r_1} A_{1y} - \frac{1}{r_2} A_{2y} = \frac{1}{r_1} A_{1y,bending} - \frac{1}{r_2} A_{2y,bending} \quad \text{(Eq. 4)}$$

From testing, a theoretical model and/or from simulations, the response of a blade under a range of loads may be known. Using this information, an estimate may be formed and used to monitor the blade.

One example of an estimate is based on a first order linear approximation. Some blades will approximately bend linearly under the influence of a load. A linearly bent blade 20-3 is schematically illustrated in FIG. 2. According to this approximation, the acceleration values will be related to each other by:

$$A_{2x} = \frac{r_2}{r_1} A_{1x} + \Delta \approx \frac{r_2}{r_1} A_{1x} \quad \text{(Eq. 5)}$$

The rightmost expression is only approximate since there will be an additional non-linear component $\Delta$, i.e. a non-linear residual with a sign dependent on the direction of the blade acceleration. For small to normal loads Δ will be small and the approximation will consequently be fairly accurate.

Based on the linear approximation, an acceleration estimate, or linear prediction, E of $A_{2x}$ based on $A_{1x}$ may be formed:

$$E = \frac{r_2}{r_1} A_{1x} \tag{Eq. 6}$$

The difference between E and the determined acceleration value $A_{2x}$ gives an indication of the bending characteristics of the blade, i.e. if the linear model is a good approximation (a lesser difference) or a less good approximation (a greater difference). Alternatively, an estimate E of $A_{1x}$ may be formed based on $A_{2x}$ and the estimate E may be subsequently compared to the determined acceleration value $A_{1x}$.

The linear approximation will be more accurate for a lesser load and consequently for lesser amounts of bending. For a larger load, the actual bending will increasingly deviate from the linear bending model, i.e. the magnitude of Δ will increase.

The blade bending model and formulas described above are correspondingly applicable for monitoring blade bending and loading in the tangential y-direction. The index x may thus be replaced with index y in Eqs 5 and 6. One advantage with the linear model is that varying angular speeds of the rotor may be conveniently compensated for in the y-direction. The comparison of the estimate E with the determined acceleration value $A_{2y}$ may be expressed as:

$$A_{2y} - E = \tag{Eq. 7}$$
$$A_{2y} - \frac{r_2}{r_1} A_{1y} = (A_{2y,bending} + \omega r_2) - \frac{r_2}{r_1}(A_{1y,bending} + \omega r_1) =$$
$$A_{2y,bending} - \frac{r_2}{r_1} A_{1y,bending} = A_{2y,bending} - E_{bending}$$

In other words, the result of the comparison between the estimate E and the determined acceleration value $A_{2y}$ is independent of variations of the rotational speed. This increases the accuracy and reliability of the comparison.

If a linear estimate is formed and a comparison with the actual measured accelerations indicates that the linear estimate is accurate, the differential acceleration between two radial positions on blade 20 will approximately be:

$$A_{1x} - A_{2x} \approx A_{1x} - \frac{r_2}{r_1} A_{1x} = \left(1 - \frac{r_2}{r_1}\right) A_{1x} = k A_{1x} \tag{Eq. 8}$$

where k is a constant dependent on the radial position $r_1$ of the first accelerometer 30 and the radial position $r_2$ of the second accelerometer 32. Thus, an increased difference between $A_{1x}$ and $A_{2x}$ indicates an increased acceleration of the blade 20.

From real world testing or simulations the response of a blade 20, 22, 24 may be established. By storing the response in a look-up-table (LUT) or similar a blade acceleration at a second radial position may be estimated, or predicted, from an actual measured acceleration at a first radial position. For example, a first column of the LUT may comprise acceleration values at a first radial position measured during testing or established during simulations. A second column may comprise corresponding acceleration values at a second radial position. By measuring an acceleration at the first radial position, the acceleration at the second radial position may be estimated from the second column of the LUT. The estimate may then be compared to an actual measured acceleration at the second radial position.

A LUT may be extended with further columns with acceleration values at further radial positions. The estimate may also be formed using several measured acceleration values. The LUT approach enables monitoring of blades having virtually any design and load response.

Returning to FIG. 1, in order to monitor the blades with respect to loads, bending and blade conditions etc, each blade 20, 22, 24 of wind turbine 10 of the first embodiment is provided with two 2-axis accelerometers. The locations of the first and second accelerometers on the blade 20 are schematically indicated with reference numerals 30 and 32, respectively.

Although in the following, reference will be made to the accelerometers provided on blade 20 the following description is also applicable to accelerometers of the further blades 22, 24.

The first sensitive axis of the first accelerometer 30 is orthogonal to the rotational plane of the rotor 16, i.e. the x-direction. The second sensitive axis of the first accelerometer 30 is parallel to the tangential direction of the rotation of the blade 20, i.e. the y-direction.

The sensitive axes of the second accelerometer 32 provided on the blade 20 are correspondingly aligned. I.e., the first sensitive axis of the first accelerometer 30 and the first sensitive axis of the second accelerometer 32 are parallel, and the second sensitive axis of the first accelerometer 30 and the second sensitive axis of the second accelerometer 32 are parallel. Consequently, the first and second accelerometer 30, 32 measures acceleration in common directions.

Each accelerometer typically generates a signal (e.g. a voltage or current) with a magnitude being proportional to the acceleration of the accelerometer. The accelerometers may output a separate signal for each sensitive axis. Alternatively the accelerometers may generate a combined output for the sensitive axes where a signal amplitude is the length of the vector sum of the components for the sensitive axes and the signal phase indicates the amplitude distribution between the sensitive axes. I.e. the output from the accelerometers may be provided in either a polar or rectangular form.

Advantageously, the accelerometers may be Micro Electrical Mechanical System (MEMS) accelerometers. MEMS accelerometers have low weight, small size and low power consumption. They provide accurate DC to low-frequency range measurements. They normally have very low DC-signal leakage and may therefore reliably measure both variable and constant accelerations.

The first and second accelerometer 30, 32 are mounted inside of the blade's airfoils. Alternatively, the accelerometers may be provided in a hole in the surface of the blade 20. The hole may be closed with an openable cap for quick and easy access and replacement. The first accelerometer 30 is provided in a radially inner part of the blade 20, i.e. near or at the root of the blade 20. The second accelerometer 32 is provided in a radially outer part of the blade 20.

Other configurations are also possible, e.g. both the first and second accelerometer provided in a radially inner part, both the first and second accelerometer provided in a radially outer part, the first accelerometer provided in a radially inner part and the second accelerometer provided at a central part of the blade etc.

Regardless of configuration, the first and second accelerometer, or at least the acceleration sensitive part of the accelerometer in case a multi-part accelerometer is used, should be separated radially to such an extent that the blade may bend between the accelerometers.

The accelerometers 30, 32 may be powered by a small replaceable battery or through electricity provided from the nacelle through electrical wires in the blades. Alternatively, the accelerometers may be self-powered, e.g. using solar power, vibrational energy harvesting, wirelessly transmitted electricity etc.

Figure 3:
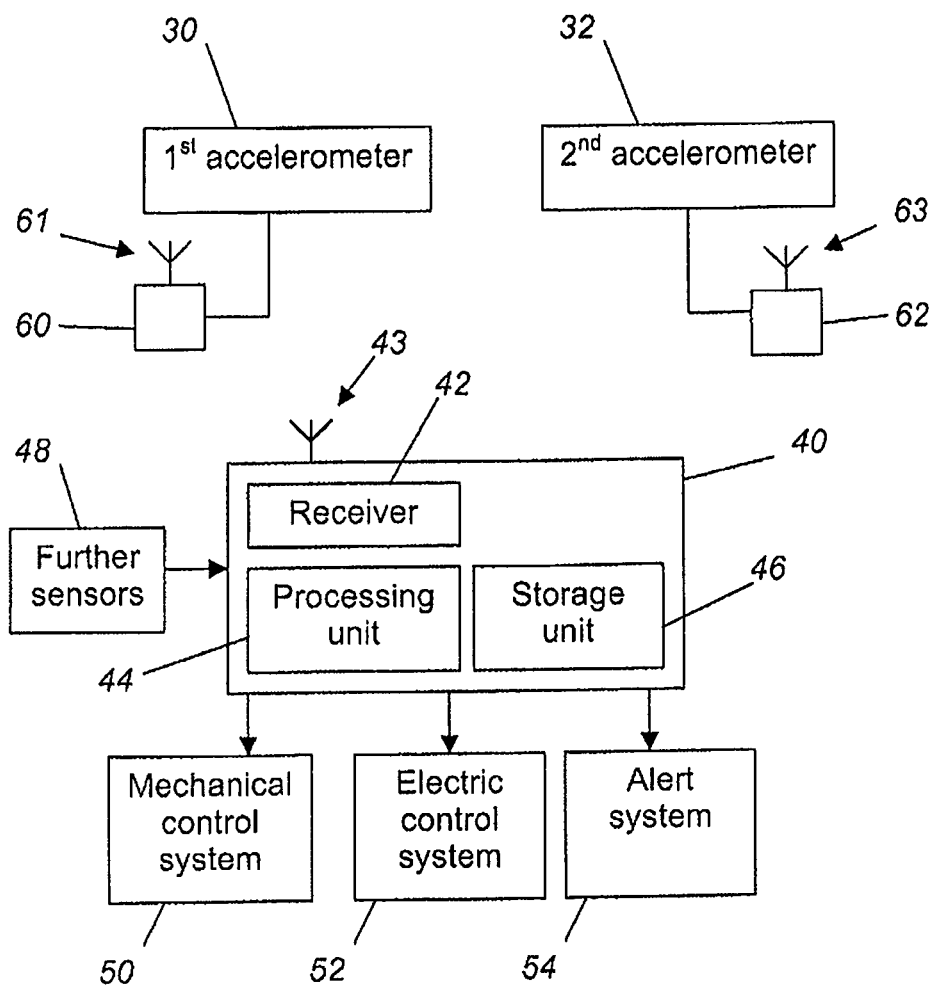
FIG. 3 diagrammatically illustrates a wind turbine controller of the wind turbine according to the first embodiment.

The nacelle 14 of the wind turbine 10 comprises a condition monitoring unit (CMU) whose location is schematically indicated with reference numeral 40. FIG. 3 diagrammatically illustrates the CMU 40 and its interaction with various components of the wind turbine 10. Although according to the first embodiment the CMU 40 is provided in the nacelle 14, other placements are equally possible, e.g. in the tower 12, hub 18 or in the rotor 16.

The CMU 40 comprises a receiver 42 connected to an antenna 43. The first accelerometer 30 is connected to a first transmitter 60 connected to an antenna 61. The second accelerometer 32 is connected to a second transmitter 62 connected to an antenna 63. Optionally, the first and second accelerometers may be connected to a first 60 and second 62 transmitter-receiver unit. The first and second accelerometers 30, 32 transmit acceleration data through respective transmitter 60, 62 and antenna 61, 63. The receiver 42 of the CMU 40 wirelessly receives acceleration data from the first and second accelerometers 30 and 32 through antenna 43.

Optionally, the accelerometers 30 and 32 may be wired to the CMU 40 and arranged to transmit accelerometer data to the CMU 40 through the wires.

The accelerometer output may be converted into respective accelerometer values $A_{1x}$, $A_{1y}$ for the first accelerometer's sensitive axes and $A_{2x}$, $A_{2y}$ for the second accelerometer's sensitive axes. The output may be converted to bit sequences using an ND converter. The accelerometer values may be transmitted in the form of one or more data packets according to principles well-known in the art. The conversion may take place in a signal processing unit in each accelerometer 30, 32 or in their respective transmitters 60, 62. The output or data may be low-pass filtered to remove signal noise and unwanted high frequency vibration components.

The receiver 42 is connected to a processing unit 44 and provides received accelerometer values to the processing unit 44. The processing unit 44 may receive data from further sensors (e.g. temperature sensors, anemometers etc.) and further data relating to pitch angles of the blades, yaw angle of the rotor etc. The processing unit 44 monitors the blades 20, 22, 24 based on the received acceleration values. Based on the result of the processing, the CMU 40 generates a signal.

The signal may be a control signal for adapting the operation of the wind turbine through mechanical or electrical control system 50, 52. For example, the mechanical control system 50 may pitch a blade 20, 22, 24, brake the rotor 16, yaw the nacelle 14 etc. Optionally, the electrical control system 52 may brake the rotor by applying appropriate generator control. The degree of pitching, braking or yawing may be proportional to the differential acceleration or the difference between an estimate and a determined acceleration value. A fixed degree of pitching may also be used regardless of the magnitude of the differential acceleration or the magnitude of the difference between an estimate and a determined acceleration value.

The signal may be an alert signal. Alert system 54 may send an alert to a remote control facility in accordance with the alert signal. The alert could be sent if the CMU 40 determines a critical blade condition such as a fractured blade or if the differential acceleration exceeds a threshold etc. Different levels of alerts may be used depending on the type of determined condition, or the magnitude of the differential acceleration etc. The alert may include information regarding the estimated blade condition, which blade the condition relates to, a rotor phase, the ambient conditions at the time the condition was determined etc. As disclosed above, the signal may also be presented on a display, e.g. in the form of a graph, in the control facility, wherein an operator at the control facility may determine if any action is needed based on the received signal.

As an alternative or an addition to controlling and alerting, the CMU 40 may log a determined blade condition and store it in storage unit 46 for later retrieval and analysis. The log may include information regarding the estimated blade condition, which blade the condition relates to, a rotor phase, the ambient conditions at the time the condition was determined etc.

The CMU 40 may be implemented in one or several electronic circuits or in computer readable form and carried out by a computer. Although the control systems have been illustrated as separate from the CMU 40, some or all of its functionality may be implemented in the CMU 40. Additionally some or all of the functionality of the CMU 40 may be integrated in a stand-alone unit, distributed over several interacting units, integrated in some or all of the accelerometers 30, 32. Further implementations are possible without departing from the scope of the invention.

Figure 4:
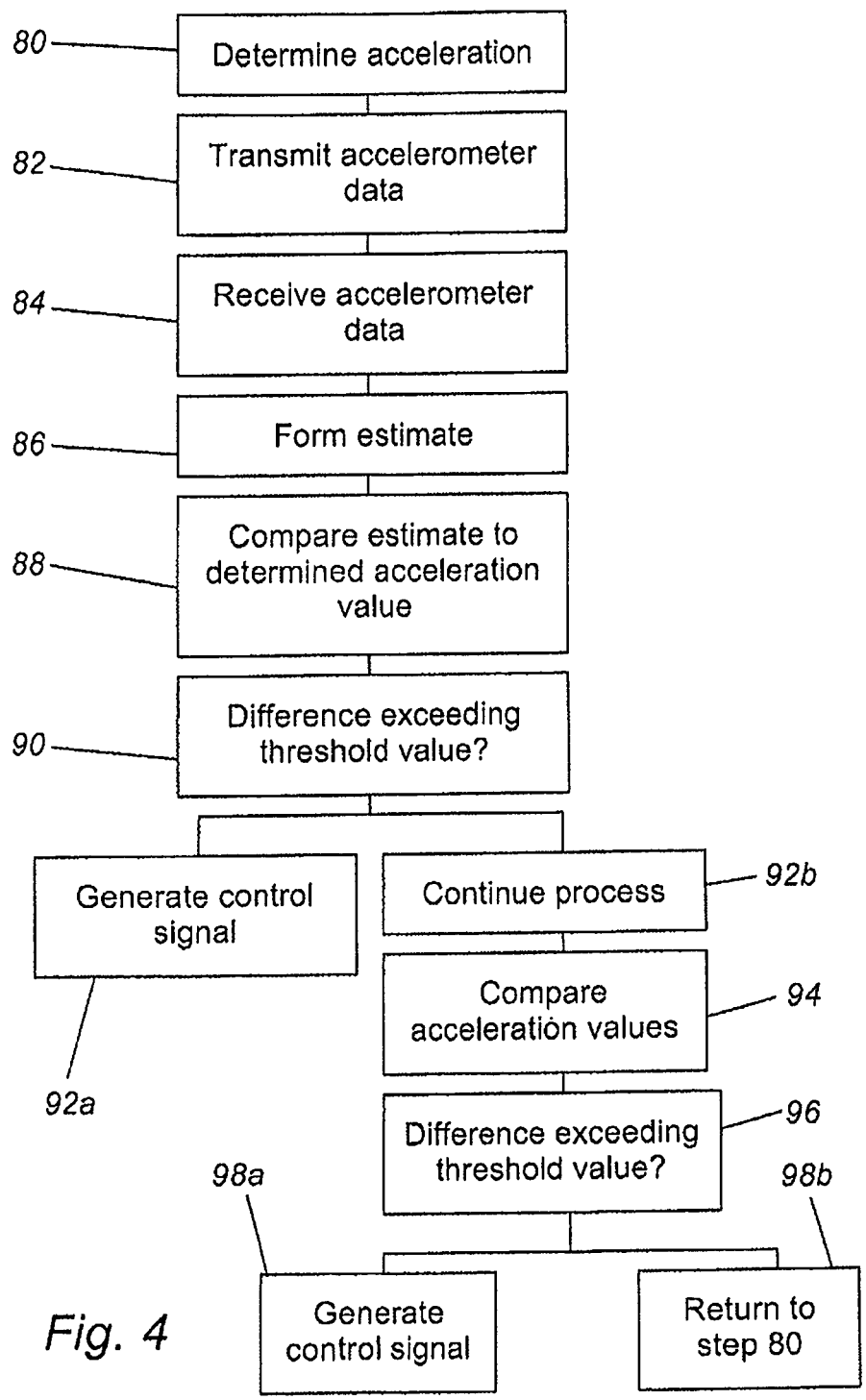
FIG. 4 illustrates a method for monitoring a wind turbine.

Now, a process for monitoring a blade of the wind turbine 10 of the first embodiment will be described with reference to FIG. 4. The accelerometers 30, 32 of the blade 20 determines the acceleration of the blade (step 80) for the x-direction. The accelerometers' output are converted to accelerometer data or accelerometer values $A_{1x}$, $A_{2x}$, and transmitted to the CMU 40 (step 82). The processing unit of the CMU 40 receives the accelerometer data (step 84). The processing unit forms an estimate E of $A_{2x}$, based on $A_{1x}$ (step 86). The estimate E is then compared to $A_{2x}$ (step 88). The difference between E and $A_{2x}$ is compared to a first threshold value (step 90). If the difference exceeds the first threshold (step 92a) a first control signal is generated for e.g. pitching the blade 20, braking the wind turbine 10 or possibly stopping the wind turbine 10. Optionally, the processing unit may generate a first fault signal and/or a first log signal. The process then returns to step 80. If the difference falls below the threshold (step 92b) the process continues in step 94.

The processing unit then compares $A_{1x}$ to $A_{2x}$ in order to determine the differential acceleration of the blade (step 94). The differential acceleration is compared to a second threshold value (step 96). If the differential acceleration falls below the second threshold (step 98b) no signal is generated and the process returns to step 80. If the differential acceleration exceeds the second threshold (step 98a) a second control signal is generated for controlling the wind turbine 10 in order to reduce the differential acceleration (e.g. by pitching the blade). By this wind turbine control, large blade bending and overloading of the blades may be prevented. Specifically, the controlling may prevent the difference between the estimate E and $A_{2x}$ from reaching and exceeding the first threshold. Optionally, the processing unit may generate a second fault signal and/or a second log signal. The process then returns to step 80.

This process is carried out correspondingly for monitoring the blade in the y-direction.

As described above, a first signal may be generated based on the comparison of the estimate E and $A_{2x}$ and a second signal may be generated based on the differential acceleration. Different and separate actions (e.g. control, log etc) may thus be performed based on the comparison of the estimate E and $A_{2x}$ and the determination of the differential acceleration.

Optionally, steps 86-92 may be skipped and the blade may be monitored based only on the differential acceleration.

Optionally, steps 94-98 may be skipped and the blade may be monitored based only on the estimate and the comparison with the measured acceleration values.

As been described, the processing may optionally involve a comparison with a first and second threshold value. In case of blade monitoring based on the differential acceleration the first threshold is useful to avoid taking control actions in response to signal noise, small vibrations, small loads etc. Different thresholds may be used for the x- and y-directions. The threshold enables robust and reliable blade monitoring. The threshold further enables more robust and stable control of the wind turbine based on the differential accelerations.

In case of blade monitoring based on an estimate and comparison to a measured acceleration value, the second threshold is useful due to the approximate nature of the estimate. The second threshold may thus be used to ignore small differences between the estimate and the measured acceleration value. These will in general always be present since the estimate in general will differ from the measured value. Either due to the approximate nature of the estimate or because of interference, noise etc.

The value of the first and second thresholds will depend on the characteristics of the blade, the separation of the accelerometers, the sensitivity of the accelerometers, the estimate used etc.

The accelerometer data may be periodically transmitted from the accelerometers 30, 32. Alternatively the accelerometer values may be sampled at a specific rotor phase. During rotation of the rotor 16, a time-varying gravity induced acceleration signal will be generated for the y-axis of the accelerometers. It is thus possible to establish the phase of the rotor from the time-varying acceleration and the accelerometers may be arranged to transmit the accelerometer data at a specified rotor phase. For example, acceleration data may be transmitted as the blade 20 points directly towards or directly from the ground. This makes it possible to correlate the blade condition with the current rotor phase, i.e. blade angle. One advantage with this approach is that acceleration values may be sampled at any intended phase without any need of additional sensors, timers or control circuitry.

The accelerometers may be arranged to individually transmit data at specific rotor phases. Alternatively, the first (or second) accelerometer may be arranged to transmit a trigger signal to the second (or first) accelerometer at a specific rotor phase. The second (or first) accelerometer may in response to receiving the trigger signal transmit the current accelerometer output as accelerometer data. As the first (or second) accelerometer has transmitted the trigger signal, it may transmit its current accelerometer output as accelerometer data. This approach provides a convenient way of ensuring that the data from the first and second accelerometers are generated at the same rotor phase without requiring careful timing control or calibration of both accelerometers. The trigger signal may further be used to trigger data sampling for further accelerometers provided on the same or on further blades. The trigger signal may be sent and received by the corresponding transmitters and receivers 60, 62. If the accelerometers are connected by wires, the trigger signal may be sent through the wires.

The time-varying gravity component may also be used to register the total rotational cycles of a blade and correlate this information with the information from the further blade monitoring.

Figure 5:
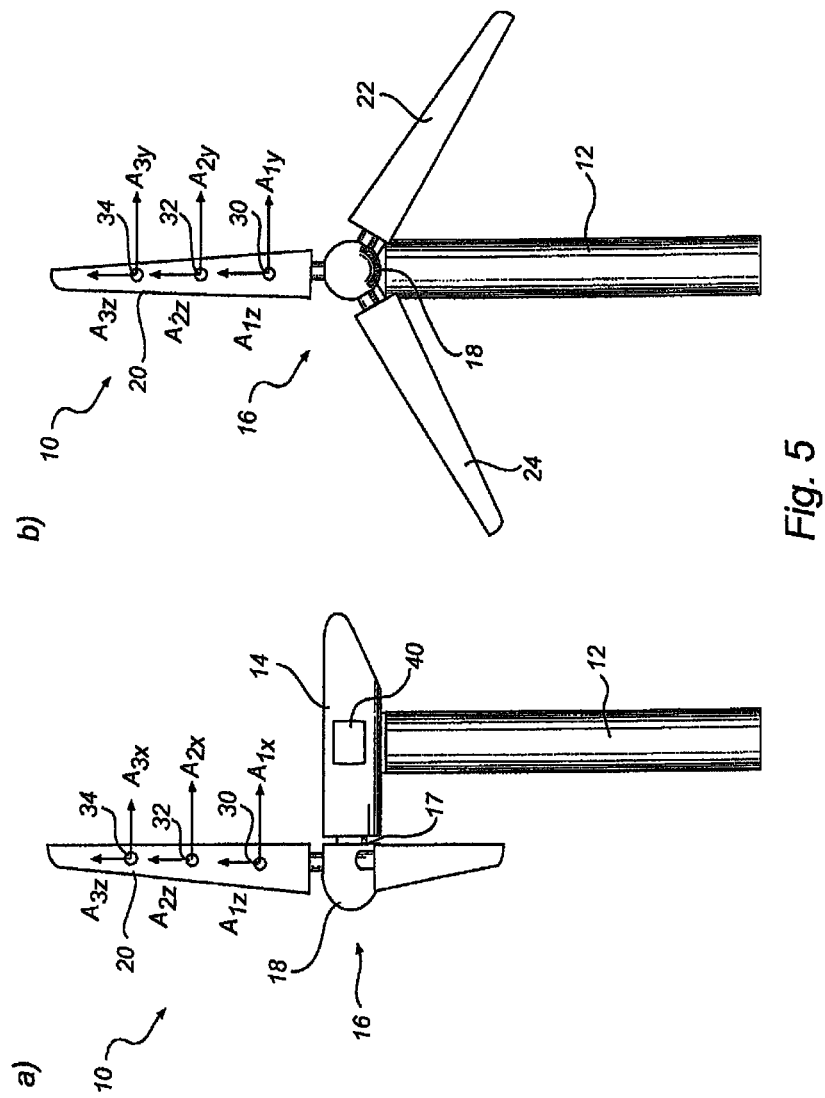
FIG. 5 illustrates a wind turbine according to a second embodiment in accordance with the inventive concept.

In accordance with a second embodiment of a wind turbine 10, a blade 20 may be provided with three 2-axis accelerometers, see FIG. 5. Specifically, blade 20 is provided with first accelerometer 30, second accelerometer 32 and third accelerometer 34. The sensitive axes of the accelerometers are aligned as illustrated in FIG. 5. Consequently, the first, second and third accelerometer 30, 32, 34 measures acceleration in common directions.

The first accelerometer 30 is provided in a radially inner part of the blade 20, i.e. near or at the root of the blade 20. The second accelerometer 32 is provided in a mid-section of the blade 20. The third accelerometer 34 is provided in a radially outer part of the blade 20.

Other configurations are also possible, however the first, second and third accelerometer, or at least the acceleration sensitive part of the accelerometer in case a multi-part accelerometer is used, should be separated radially to such an extent that the blade may bend between each pair.

The first accelerometer 30 is arranged to determine acceleration values $A_{1x}$ and $A_{1y}$. The second accelerometer 32 is arranged to determine acceleration values $A_{2x}$ and $A_{2y}$. The third accelerometer 34 is arranged to determine acceleration values $A_{3x}$ and $A_{3y}$. The previously described processing may then be performed on all pairs of acceleration values. I.e., comparing $A_{1x}$ to $A_{2x}$, comparing $A_{1x}$ to $A_{3x}$, comparing $A_{2x}$ to $A_{3x}$, forming an estimate of $A_{2x}$ based on $A_{1x}$, forming an estimate of $A_{3x}$ based on $A_{1x}$, and forming an estimate of $A_{3x}$ based on $A_{2x}$. A signal may be generated based on all accelerometer pairs or separately for each accelerometer pair.

Alternatively, an estimate of $A_{3x}$ may be formed based on both $A_{1x}$ and $A_{2x}$, an estimate of $A_{2x}$ may be formed based on both $A_{3x}$ and $A_{1x}$, etc.

The estimates may be a linear estimate, based on a LUT etc.

The monitoring for the x-direction may be correspondingly carried out for the y-direction as well. The addition of a third accelerometer improves the knowledge of the blade and enables an improved blade monitoring.

In addition to bending, a blade may also be deformed by twisting of the blade. A twisting deformation will alter the effective angle of attack of the blade and thereby alter the aerodynamic properties of the blade. A twist of a blade is defined as a rotational displacement between two cross sections of a blade. Thus, a blade is twisted about its pitch axis. By providing two radially separated angle sensors (or gyroscopic sensors) on a blade, it is possible to determine the blade twist. For example a first angle sensor may be provided at the location of reference numeral 30 in FIG. 5 and a second angle sensor may be provided at the location of reference numeral 32 in FIG. 5. The angle sensor may be a gyroscopic sensor. A change in the differential angle between the two angle sensors indicates a differential blade twist. By determining a change in angle between the sensors the blade twist may be determined. A large or increasing blade twist may be indicative of increased blade loads or possibly fractures in the blades. The wind turbine may be controlled in accordance with the twist. By feeding-back the determined twist to a pitch controller it is possible to adjust the pitch angle in accordance with the blade twist. By doing this for at least one of the blades, it is possible to improve the energy production of the wind turbine.

As an optional addition to the wind turbines of the first and second embodiments, an angle sensor may be provided adjacent to or in connection with each accelerometer (i.e. reference numerals 30, 32 in FIGS. 1 and 30, 32, 34 in FIG. 5). If blade 20 twists between a pair of accelerometers, the sensitive axis (x- and y-directions) of the pair of accelerometers will no longer be parallel. Therefore, the acceleration values for the x- and y-directions will not be determined for a common direction. This may introduce errors in the calculation of the differential acceleration and the estimate. However by monitoring the differential twist of blade 20 between the first and second radial positions using the angle sensors, a differential twist may be detected and compensated for in the processing of the accelerometer values by projecting the acceleration value of one accelerometer onto the direction of the other accelerometer, e.g. using a trigonometric calculation or similar.

As an alternative to the wind turbine 10 of the first and second embodiment, one sensitive axis of each accelerometer on a blade may be aligned with the length-wise direction of the blade. The centrifugal acceleration of the blade may then be determined. With reference to FIG. 5, the first accelerometer 30 may determine a centrifugal acceleration value $A_{1z}$, the second accelerometer 32 may determine a centrifugal acceleration value $A_{2z}$, and the third accelerometer 34 may determine a centrifugal acceleration value $A_{3z}$. The differential centrifugal acceleration may then be determined for each pair of accelerometers 30, 32, 34. For example, by comparing $A_{1z}$ to $A_{2z}$ the differential centrifugal acceleration between the first and second accelerometers may be determined:

$$A_{1z} - A_{2z} \qquad (Eq.\ 9)$$

A large differential centrifugal acceleration may indicate large forces in the blade. The wind turbine may be controlled in accordance with the differential acceleration to limit the stress on the wind turbine, e.g. by reducing the rotational speed of the rotor.

The differential centrifugal acceleration may also be used to monitor the rotational stability of a blade 20, 22, 24. The blade tip speed v is given by:

$$v = R\sqrt{\frac{A_{1z} - A_{2z}}{r_1 - r_2}} \qquad (Eq.\ 10)$$

where R is the length of a blade 20, 22, 24, i.e. the radial position of the blade tip. The centrifugal acceleration of the differential centrifugal direction may also be used to register the total rotational cycles of a blade 20, 22, 24 and correlate this information with the information from the further blade monitoring. The centrifugal acceleration value may be determined in addition to or instead of an acceleration value in any other direction (e.g. the tangential and orthogonal directions). Especially, if 2- or 3-axis accelerometers are used the centrifugal acceleration or differential centrifugal direction may be used to trigger the sampling of acceleration values for the other sensitive axes at specific rotor phases as have been previously described.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A wind turbine with at least one blade comprising:
 a first accelerometer mounted at a first radial position of the blade and being adapted to determine a first acceleration value,
 a second accelerometer mounted at a second radial position of the blade different from the first radial position, and said accelerometer being adapted to determine a second acceleration value, and
 a controller adapted to generate a signal based on said first and second acceleration values,
 wherein said controller is adapted to determine an estimate of the second acceleration value based on the first acceleration value and generate said signal if a difference between the second acceleration value and the estimate of the second acceleration value exceeds a threshold.

2. The wind turbine as claimed in claim 1, wherein the controller is adapted to compare said first and second acceleration values and generate said signal based on a difference between said first and second acceleration values.

3. The wind turbine as claimed in claim 2, wherein the controller is adapted to weight at least one of said first and second acceleration values prior to the comparison.

4. The wind turbine as claimed claim 2, wherein the controller is adapted to generate said signal if said difference exceeds a threshold.

5. The wind turbine as claimed in claim 1, wherein the controller is adapted to determine said acceleration estimate based on the first acceleration value, the first radial position and the second radial position.

6. The wind turbine as claimed in claim 5, wherein said controller is adapted to determine said acceleration estimate based on a linear prediction of the second acceleration value.

7. The wind turbine as claimed in claim 1, wherein the controller is adapted to generate said signal based on acceleration values determined for a common direction.

8. The wind turbine as claimed in claim 1, wherein said signal is a control signal and the controller is adapted to control the operation of the wind turbine in accordance with the control signal.

9. The wind turbine as claimed in claim 8, wherein the controller is adapted to control a pitch angle of the blade.

10. A method for monitoring a blade of a wind turbine, comprising:
 determining a first acceleration value at a first radial position of the blade,
 determining a second acceleration value at a second radial position of the blade, the second position being different from the first position,
 generating a signal based on the first and second acceleration values, and
 determining an estimate of the second acceleration value based on the first acceleration value and generating the signal if the determined second acceleration value differs from the estimated second acceleration value by more than a threshold.

11. The method as claimed in claim 10, comprising comparing the first and second acceleration values and generating the signal based on a difference between the first and second acceleration values.

12. The method as claimed in claim 11, wherein at least one of the first and second acceleration values is weighted prior to the comparison.

13. The method as claimed in claim 11, comprising generating the signal if the difference exceeds a threshold.

14. The method as claimed in claim 10, comprising determining the acceleration estimate based on the first acceleration value, the first radial position and the second radial position.

15. The method as claimed in claim 14, wherein the acceleration estimate is a linear prediction of the second acceleration value.

16. The method as claimed in claim 10, wherein the first and second acceleration values are determined for a common direction.

17. The method as claimed in claim 10, wherein the signal is a control signal and the method further comprises controlling the operation of the wind turbine in accordance with the control signal.

18. The method as claimed in claim 17, wherein the controlling comprises pitching the blade.

* * * * *